United States Patent [19]

Bartholomew

[11] Patent Number: 4,504,122
[45] Date of Patent: Mar. 12, 1985

[54] SYSTEM AND METHOD FOR TIME SHARING LASER SYSTEM WHICH ALSO GENERATES A LOCAL OSCILLATOR SIGNAL

[75] Inventor: Bruce J. Bartholomew, Poway, Calif.

[73] Assignee: General Dynamics Corporation/Convair Div., San Diego, Calif.

[21] Appl. No.: 487,333

[22] Filed: Apr. 21, 1983

[51] Int. Cl.³ .......................... G02F 1/00; G02B 5/30
[52] U.S. Cl. ..................................... 350/388; 350/401
[58] Field of Search ............. 350/388, 401, 403, 407, 350/408; 370/2; 455/600, 602; 372/12

[56] References Cited

U.S. PATENT DOCUMENTS

| | | | |
|---|---|---|---|
| 3,087,377 | 4/1963 | Daley | 350/403 X |
| 3,435,229 | 3/1969 | Buhrer | 370/2 |
| 3,464,026 | 8/1969 | Woodbury et al. | 372/12 X |
| 4,059,759 | 11/1977 | Harney | 350/388 X |
| 4,299,451 | 11/1981 | Task et al. | 350/407 |

FOREIGN PATENT DOCUMENTS 62012  4/1982  Japan ................................... 350/408

Primary Examiner—John K. Corbin
Assistant Examiner—David Lewis
Attorney, Agent, or Firm—John R. Duncan; Frank D. Gilliam

[57] ABSTRACT

A time shared transceiver laser system which may be rapidly switched between two subsystems while using the full power of the laser beam and which also generates a local oscillator beam required for coherent detection. A method of time sharing and for generating the local oscillator is disclosed.

21 Claims, 2 Drawing Figures

SYSTEM AND METHOD FOR TIME SHARING LASER SYSTEM WHICH ALSO GENERATES A LOCAL OSCILLATOR SIGNAL

FIELD OF THE INVENTION

This invention relates to an improvement in time shared laser systems and more particularly, but not by way of limitation, to a time shared laser system that may be rapidly switched between two subsystems while using the full power of the laser beam and which also generates a local oscillator beam required for coherent detection.

BACKGROUND OF THE INVENTION

In the past it has been known to provide a time sharing laser system but it has remained highly desireable to provide a time sharing laser system which is arranged to share the laser beam in a manner so that each subsystem may use the full power in the beam. It is also required in such a time shared laser system that the system be able to switch the beam rapidly and efficiently between the two subsystems. In order to provide for coherent detection of the laser beam it is necessary to provide a local oscillator beam, having a controllable intensity, for each subsystem channel and to be able to mix the local oscillator beam efficiently with the signal beam, even when the signal beam returns off axis.

These needs prior to the present invention have heretofore been unmet. The U.S. Pat. No. 3,087,377 to W. J. Daley (issued Apr. 30, 1963) for a Polarized Light Autocollimator discloses an instrument for detecting very small changes in the angular rotation of a reflective element. The Daley system includes a beam splitter which reflects a portion of an incident beam, the transmitted portion being trapped and rejected, the reflected beam then being collimated and aimed at a reflecting element, the rotational displacement of which about an axis at right angles to a beam striking it is to be measured. The light reflected from the reflecting element passes through the beam splitter and then through a rotating quarter wave plate and is imaged by a split field analyzer and a lens on a photoelectric light detector. The light from the light source to the beam splitter is circularly polarized while the rotating quarter wave plate transforms the circularly polarized light into substantially plane polarized light, the plane of polarization of which rotates. It will be seen in the Daley system that it is merely an autocollimator for detecting very small changes in angular rotation of a reflective element and is not directed to nor discloses a time shared laser system which utilizes a polarizing beam splitter to switch the full power of the incident beam between two subsystems and to generate a local oscillator signal for coherent detection.

U.S. Pat. No. 3,956,626 to Monte Ross (issued on May 11, 1976) for a Pulse Quaternary Communication Means discloses a pulse quarternary modulation transmitter configuration which includes means for using a combination of polarization states and pulsed position information to represent information choices. The Ross system discloses first, second, and third modulator means, means associated with the first modulator means to predeterminately polarize the received optical pulses, and a polarizing beam splitter positioned to respond to the output of the first modulator means to separate the output pulses therefrom according to their polarization. The second and third modulator means then receive such separated pulse streams with appropriate delay means and synchronous polarizer means and drive means are provided to combine such outputs to produce a pulse train of optically modulated pulses for transmission. While disclosing a very sophisticated and complex laser system that does utilize a polarizing beam splitter, the Ross patent is basically concerned with providing a transmitter sending output laser pulses and such system is not directed to a time shared transceiver system showing the switching of the beam between the output ports nor does it disclose the generation of a local oscillator beam required for coherent detection.

U.S. Pat. No. 4,059,759 to Robert C. Harney et al (issued Nov. 22, 1977) and entitled Passive and Active Pulse Stacking Scheme for Pulse Shaping is directed to an apparatus and method for producing a sequence of radiation pulses with a pulse envelope of time variation which is controllable by an external electromagnetic signal applied to an active medium by a sectored reflector, through which the radiation passes. The Harney et al apparatus includes a magneto-optical modulator positioned intermediate a polarizer means and an analyzer means and further includes a power supply and optical switch means for externally producing a controllable, time-varying electromagnetic signal at the magneto-optical modulator in response to receipt of a portion of an incoming beam of light for producing a pulsed beam of light, a sequence of light pulses with a pulse envelope of controllable time variation. Although the Harney et al apparatus provides a beam splitter to direct a portion of a beam of pulsed electromagnetic radiation to the power supply and optical switch, it does not disclose a time shared transceiver laser system which utilizes a polarizing beam splitter to switch two signal beams with means provided to generate a local oscillator beam for each channel.

In the article entitled The Antenna Properties of Optical Heterodyne Receivers in the October 1966 issue, Vol. 5, No. 10 of APPLIED OPTICS, the need for a stable single-frequency local oscillator for optical heterodyne and homodyne receivers was recognized although no means for generating such a local oscillator was disclosed.

SUMMARY OF THE INVENTION

Briefly stated, the present invention contemplates a time shared laser system which includes means for generating a laser beam and means to modulate the laser beam to provide predetermined pulses in said beam to represent desired information. Means polarize the modulated laser beam between two orthogonally polarized states, which beam is then split into a first beam having one polarized direction and into a second beam having another polarized direction. Means then direct a portion of the first and second beams back through the beam splitting means oppositely to the original splitting of the beam. Detecting means then receive the redirected beam portions and generate a local oscillator signal for coherent detection.

The invention further contemplates a method of generating a local oscillator signal for use in a laser system which comprises generating a modulated pulsed laser beam having at least two polarization states and splitting the modulated beam into a beam having a first polarization state and into a beam having a second polarization state. A small portion of each beam is then redirected back along its original axis with the two redirected beams being mixed to form a single redirected beam polarized in parallel with the single redirected beam being redirected to provide a local oscillator signal.

Other aspects of the invention will be evident from the following detailed description, when read in conjunction with the accompanying drawings which illustrate the invention.

DETAILED DESCRIPTION OF THE DRAWING

Figure 1:
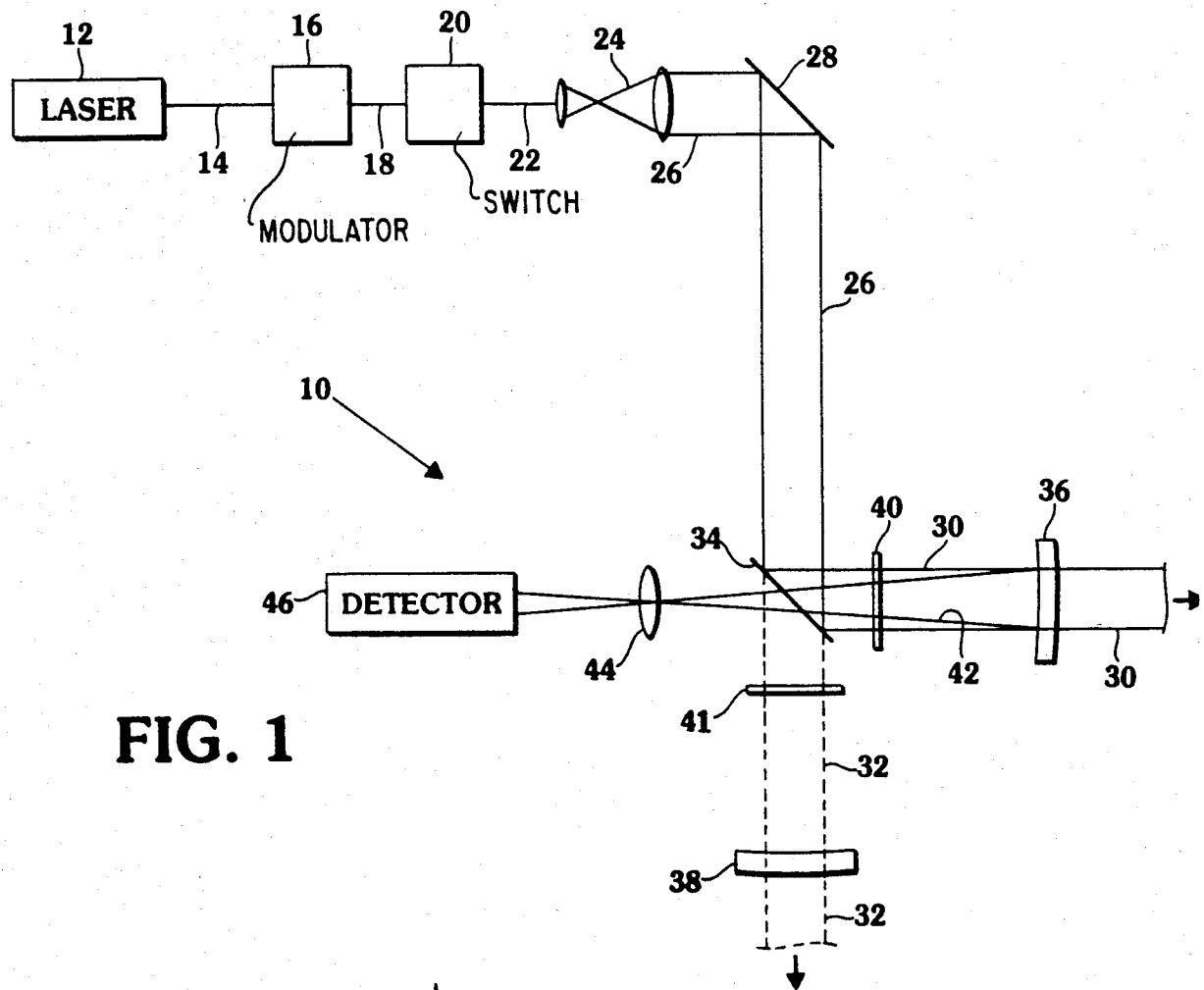
FIG. 1 is a simplified block diagram of a time shared laser system embodying the present invention.

Referring to the drawing in detail, and particularly FIG. 1, reference character 10 designates one embodiment of a time shared laser system constructed in accordance with this invention. The laser system 10 includes a suitable laser source 12 which emits a pulsed laser beam as shown by character 14. The laser beam may be modulated by modulator 16 to make a modulated beam 18. Modulation is not required nor does it affect the performance of the beam switching system.

The modulated beam 18 is received by a means to switch the modulated laser beam between two orthogonally polarized states. The means to switch the beam between two polarized states may take the form of a suitable controllable electro-optic crystal 20 which controllably switches the polarization between at least two orthogonally polarized states. Such controllable electro-optic polarizing means 20 are well known in the art and any one of a number of readily obtainable devices may be utilized in the practice of this invention. Other devices which switch the polarization state, such as a mechanically rotated half-wave plate could also be used.

In the illustrated example of the invention the polarizing means 20 emits a polarized laser beam 22 that is expanded by a suitable beam expanding telescope 24. The expanded polarized laser beam 26 passed by the telescope 24 is deflected by a suitable mirror 28 that does not attenuate the intensity of the beam 26 in any respect but merely deflects the beam 26 for use elsewhere in the system 10 as will be hereinafter set forth in detail.

The polarized laser beam 26 is received by a means to split the polarized laser beam 26 into a first beam having one polarized direction and into a second beam 32 having another polarized direction, such states of polarization being orthogonally polarized. The splitting means is a suitable polarizing beam splitter 34, as is well known in the art, which is adapted to pass therethrough light having one polarization and to deflect at a predetermined angle light having another polarization. Thus, one channel carrying predetermined information is passed through the beam splitter for use in one subsystem and the other channel also carrying predetermined information is deflected for use in another subsystem. Thus, the polarized laser beam carrying information is switched rapidly between two ports for use in separate subsystems.

Means are provided to direct a portion of the first and second laser beams, 30 and 32, back through beam splitting means 34 with the polarization of each portion of said beams being changed so that each redirected beam portion passes or is reflected by the beam splitting means 34 oppositely to the original splitting of the beam 26. This redirection is accomplished by positioning a first zero power lens 36 in the path of the first beam 30 and a complementary second zero power lens 38 in the path of the second beam 32. The radius of curvature of each lens 36 and 38 is selected so that a small reflection from the first surface of each lens 36 and 38 is redirected back toward beam splitter 34.

A suitable quarter wave plate 40 is positioned between the lens 36 and the beam splitter 34 and a similar quarter wave plate is positioned between the lens 38 and the beam splitter 34. The beam 30 is linearly polarized to the left of the quarter-wave and circularly polarized to the right. Beam 42 is also circularly polarized. When beam 42 passes through the quarter wave plate it becomes linearly polarized. The polarization direction of the redirected beam portion 42 after it returns to the polarizing beam splitter 34 has been rotated 90° with respect to the polarization direction of beam 30 at the beam splitter 34. Since the beam 26 had one polarization state thereof that was passed by the beam splitter 34 and one state that was reflected, it will be apparent that the polarization state that was reflected originally, per beam 30, will now be passed by the beam splitter when a redirection portion 42 thereof is received back, with its polarization having been rotated 90°. It will be apparent that the identical situation prevails with respect to the beam 32 that impinges upon lens 38.

The redirected beam portion 42 that has been reflected by lens 36 is focused on the nodal point of a suitable detector focusing lens 44 that focuses the redirected beam portion 42 on a suitable detector 46 to form the desired local oscillator signal required for coherent detection. Although only the redirected beam 42 has been discussed, a similar redirected beam portion is reflected by the lens 38 and is rotated 90° by the quarter wave plate 41 for reflection now by the beam splitter 34 and focusing also on the nodal point of the lens 44 and being spread upon the detector 46. The redirected beam portions of the beams 30 and 32 being rotated by their quarter wave plates 40 and 41 are lock polarized in parallel and in effect formed into a single beam, beam portion 42, for example, having been focused by the lens 44 on the detector 46, the intensity of such beam being controlled as desired by the lens 44.

Figure 2:
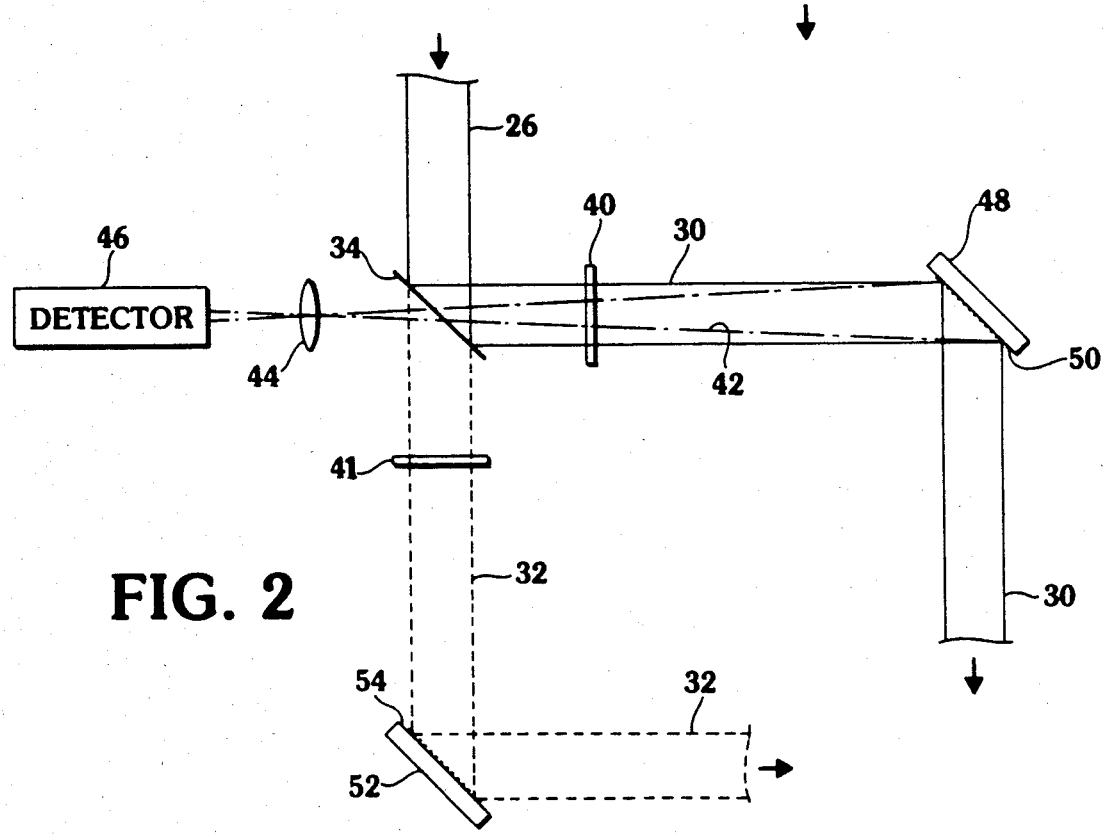
FIG. 2 is a simplified partial block diagram of another embodiment of the present invention.

Refering now to FIG. 2, another embodiment of the present invention is illustrated. In FIG. 2, the input laser beam 26 having polarization states as previously described in the description of FIG. 1 is passed or reflected as before by the polarizing beam splitter 34. The beam 30 that is reflected by the beam splitter 34 will be circularly polarized before impinging upon a suitable bending mirror 48 that is coated on one side thereof with a low efficiency hologram 50. The hologram 50 is designed so that it diffracts a small fraction (0.1%) of the incident light beam 30 back as redirected light portion 42 through the quarter wave plate 40 and the nodal point of the focusing lens 44 and onto the detector 46. The light beam 32 similarly impinges upon a bending mirror 52 that is coated with a low efficiency hologram 54 for creating a redirected beam portion as previously described in the description of FIG. 1. The low efficiency holograms 50 and 54 replace the zero power lenses 36 and 38. By using a hologram to produce the local oscillator beam this embodiment of the invention retains all the advantages of the embodiment of the invention illustrated in FIG. 1 while removing the second surface reflection that cannot be avoided with the zero power lenses 36 and 38. It would also be within the scope of the present invention to position the hologram 50 on the side of the quarter wave plate 40 away from the beam splitter 34 or on any other suitable component in the system 10.

The novel method contemplated by the present invention includes generating a local oscillator signal for use in the time shared laser system 10. The method provides generating a modulated laser beam that has at least two polarization states. The modulated beam 26 is split into a beam 30 having a first polarization state and into a beam 32 having a second polarization state. The novel method then contemplates redirecting a small portion of each beam back along its original axis and mixing the redirected beams to form a single redirected beam polarized in parallel. The single redirected beam is detected to provide a local oscillator signal. As was seen in FIGS. 1 and 2, the beams and redirected beams are rotated by quarter wave plates to permit passing through the beam splitting means for being mixed as one signal that is detected.

In summary, it has been seen how the present invention has provided a novel time shared laser system that may, by has provided a novel time shared laser system that may, by a novel method, be rapidly switched between two subsystems while using the full power of the laser beam and which also generates by a unique method a local oscillator beam required for coherent detection.

Changes may be made in the combination and arrangement of steps and procedures, as well as in the various elements of the apparatus, without departing from the spirit and scope of the following claims.

What is claimed is:

1. In a laser system, the combination comprising:
   means for generating a laser beam;
   means to modulate the laser beam to provide predetermined modulated waveform said beam to represent desired information;
   means to switch the modulated laser beam between two orthogonally polarized states;
   means to split the polarized laser beam into a first beam having one polarized direction and into a second beam having another polarized direction;
   means to direct a portion of the first and second beams back through the beam splitting means with the polarization of each portion of said beams being changed so that each redirected beam portion passes or is reflected by the beam splitting means oppositely to the original splitting of the beam,
   and detecting means to receive the redirected beam portions and to generate a signal.

2. The laser system of claim 1 wherein said beam directing means includes at least one surface coated with a hologram to diffract a small fraction of the incident beam back through the beam splitting means to the detecting means.

3. The laser system of claim 2 wherein said directing means includes at least one quarter wave plate or other equivalent device with the same effect on the polarization of the beam positioned adjacent to the beam splitting means whereby the polarization of the redirected beam is changed from linear to circular polarization to permit passage through the splitting means.

4. The laser system of claim 2 further including a lens means positioned adjacent to the splitting means to focus the redirected beam portions passing through the splitting means onto the detecting means.

5. The laser system of claim 1 wherein said beam directing means includes at least one lens having a predetermined small radius of curvature of the first surface to reflect a small portion of the incident beam back through the beam splitting means to the detecting means.

6. The laser system of claim 5 wherein said directing means includes at least one quarter wave plate or other equivalent device with the same effect on the polarization of the beam positioned adjacent to the beam splitting means whereby the polarization of the redirected beam is changed from linear to circular polarization to permit passage through the splitting means.

7. The laser system of claim 5 further including a lens means positioned adjacent to the splitting means to focus the redirected beam portions passing through the splitting means onto the detecting means.

8. The laser system of claim 1 further including a means positioned between the polarization means and the splitting means to expand the polarized beam before it reaches said splitting means.

9. The laser system of claim 1 wherein the splitting means is arranged to pass the portion of the incident beam having one polarization state and to reflect at a predetermined angle that portion of the incident beam having a second polarization state.

10. The laser system of claim 9 wherein the redirected portion of the beam that was reflected by the splitting means passes through said means and the redirected portion of the beam that was passed by the splitting means is reflected by the splitting means so that both redirected beam portions are polarized in parallel for detection by the detection means.

11. The laser system of claim 1 wherein the detecting means upon receiving the redirected beam portions generates a local oscillator signal.

12. In a laser system having a means to generate a modulated laser beam having two states of polarization, the improvement comprising:
    beam splitting means adapted to split the modulated laser beam into a first beam having a first polarized state and into a second beam having a second polarized state;
    means adapted to redirect a small portion of each of the first and second beams back along their original paths to the beam splitting means;
    means to shift the polarization of the redirected beam portion of the first beam to permit passage of such beam portions in a first parallel polarized beam; and
    means to shift the polarization of the redirected portion of the second beam to permit passage of said beam portion in a second parallel polarized beam;
    wherein said first parallel polarized beam is transmitted through said beam splitting means and said second parallel polarized beam is reflected by said beam splitting means; and means to detect such parallel polarized beam.

13. The laser system of claim 12 wherein said redirecting means includes a bending mirror or other optical component coated with a low efficiency hologram adapted to diffract a small fraction of the incident light to form said redirected beam portion.

14. The laser system of claim 13 wherein the polarization shifting means includes a quarter wave plate.

15. The laser system of claim 12 wherein said redirecting means includes a lens having a radius of curvature adapted to reflect a small fraction of the incident light from its first surface to form said redirected beam portion.

16. The laser system of claim 15 wherein the polarization shifting means includes a quarter wave plate.

17. A method of generating a local oscillator signal for use in a laser system comprising:
generating a modulated laser beam having at least two polarization states;
splitting the modulated beam into a beam having a first polarization state and into a beam having a second polarization state;
redirecting a small portion of each beam back along its original axis;
mixing the redirected beams to form a single redirected beam polarized in parallel, and
detecting the single redirected beam to provide a local oscillator signal.

18. The method of claim 17 wherein the modulated beam is split by passing that portion of the beam having a first polarization state and reflecting at a predetermined angle that portion of the beam having a second polarization state.

19. The method of claim 18 wherein the polarization of each beam is changed prior to a portion thereof being redirected and the polarization of said redirected portion is also changed prior to mixing.

20. The method of claim 17 further including means to focus the single redirected beam in a predetermined manner prior to detection.

21. The method of claim 17 wherein after the modulated beam is split into first and second beams, only one beam has a portion thereof redirected back its original axis.

* * * * *